United States Patent
Sarofim (10) Patent No.: US 11,645,755 B2
(45) Date of Patent: May 9, 2023

(54) METHOD FOR DETERMINING CHARACTERISTICS OF A SAMPLE CONTAINER IN AN IN-VITRO DIAGNOSTICS SYSTEM, ANALYZING DEVICE, AND IN-VITRO DIAGNOSTICS SYSTEM

(71) Applicant: Roche Diagnostics Operations, Inc., Indianapolis, IN (US)

(72) Inventor: Emad Sarofim, Hagendorn (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 293 days.

(21) Appl. No.: 17/197,655

(22) Filed: Mar. 10, 2021

(65) Prior Publication Data
US 2021/0287370 A1   Sep. 16, 2021

(30) Foreign Application Priority Data

Mar. 16, 2020   (EP) ..................................... 20163443

(51) Int. Cl.
*G06T 7/00*   (2017.01)
*G06T 7/11*   (2017.01)

(52) U.S. Cl.
CPC .............. *G06T 7/0014* (2013.01); *G06T 7/11* (2017.01); *G06T 2207/10152* (2013.01); *G06T 2207/30024* (2013.01)

(58) Field of Classification Search
CPC ..................... G06T 7/0014; G06T 7/11; G06T 2207/10152; G06T 2207/30024
(Continued)

(56) References Cited

U.S. PATENT DOCUMENTS

| 7,840,360 B1 | 11/2010 | Micheels et al. |
| 2012/0106811 A1* | 5/2012 | Chen ..................... B01L 3/5023 422/402 |

(Continued)

FOREIGN PATENT DOCUMENTS

| EP | 2148208 A2 * | 1/2010 | ......... G01N 35/0099 |
| JP | 2009-265827 A | 11/2009 | |

(Continued)

OTHER PUBLICATIONS

Alcicek, Zayde and Balaban, Murat Ömer, Development and application of "The Two Image" method for accurate object recognition and color analysis, Journal of Food Engineering, 2012, pp. 46-51, vol. 111.

(Continued)

*Primary Examiner* — Gabriel I Garcia
(74) *Attorney, Agent, or Firm* — Roche Diagnostics Operations, Inc.

(57) ABSTRACT

A method for determining sample container characteristics is presented. The method comprises providing first image data representing a first image of a sample container in a first scenario, wherein in the first scenario, a first illumination condition comprising a sample container background illumination is applied to the sample container; providing second image data representing a second image of the sample container in a second scenario, wherein in the second scenario, a second illumination condition different from the first is applied to the sample container; determining a mask from the first image that indicates a sub-image section of the first image comprising a sample container representation in the first image; determining sub-image data from the second image containing a sample container representation in the second image by applying the mask to the second image; and determining the sample container characteristics from an (Continued)

image data analysis comprising image sub-image data data analysis.

13 Claims, 5 Drawing Sheets

(58) Field of Classification Search
USPC .......................................................... 382/128
See application file for complete search history.

(56) References Cited

U.S. PATENT DOCUMENTS

| | | | |
|---|---|---|---|
| 2017/0350880 A1* | 12/2017 | Hirano | ............. G01N 33/54366 |
| 2018/0364268 A1 | 12/2018 | Kluckner et al. | |
| 2018/0365530 A1 | 12/2018 | Kluckner et al. | |
| 2019/0033209 A1 | 1/2019 | Kluckner et al. | |

FOREIGN PATENT DOCUMENTS

| | | | | |
|---|---|---|---|---|
| JP | 2010-107399 A | 5/2010 | | |
| JP | 2013-072806 A | 4/2013 | | |
| JP | 2017-117206 A | 6/2017 | | |
| WO | 2012/036296 A1 | 3/2012 | | |
| WO | WO-2017132166 A1 * | 8/2017 | ............. | G01F 23/00 |
| WO | 2018/022280 A1 | 2/2018 | | |
| WO | 2018/089935 A1 | 5/2018 | | |
| WO | 2019/018313 A1 | 1/2019 | | |
| WO | 2019/018314 A1 | 1/2019 | | |

OTHER PUBLICATIONS

European Search Report dated Jul. 22, 2020, in Application No. 20163443.3, 2 pp.

* cited by examiner

METHOD FOR DETERMINING CHARACTERISTICS OF A SAMPLE CONTAINER IN AN IN-VITRO DIAGNOSTICS SYSTEM, ANALYZING DEVICE, AND IN-VITRO DIAGNOSTICS SYSTEM

CROSS-REFERENCE TO RELATED APPLICATIONS

This application claims priority to EP 20163443.3, filed Mar. 16, 2020, which is hereby incorporated by reference.

BACKGROUND

The present disclosure generally relates to a method for determining characteristics of a sample container in an in-vitro diagnostics system, an analyzing device, and an in-vitro diagnostics system.

In-vitro diagnostics systems are used to analyze test samples such as blood or tissue samples that have been taken from the human body. In-vitro diagnostics can detect diseases, or other conditions, and can be used to monitor the overall health of a person, in order, to help cure, treat, or prevent diseases. In-vitro diagnostics also may be used in precision medicine to help identify patients who are likely to benefit from specific treatments or therapies. Some in-vitro diagnostics tests are used in laboratory or other health professional settings.

Sample containers, also referred to as sample vessels, such as blood collection tubes, but can also refer to other sample container such as, for example, urine, swab, tissue, bone-marrow, capillary blood et cetera, sample containers, are nowadays often processed and handled by automation solutions (i.e., in-vitro diagnostics system). Such automation solutions, to run reliably, typically require Sample Container Analysis Means (SCAM) to provide at least one of the following: recognize the presence of a sample container; recognize the status, such as open vs. closed, upward vs. upside down, labelled vs. non-labelled, spun vs. unspun condition of a sample vessel; report position and/or positioning of a container; report position and/or positioning of parts related to the container e.g., of a label or cover or orientation mark; recognize type of sample container (e.g., TTI); and recognize irregularities of/on the sample container. There is a need for clear localization of the sample container or vessel in an image taken, thereby, allowing a clear propagation of contours of sample container, e.g., in order to derive the exact geometries, status, and the like.

Current Sample Container Analysis Means (SCAM) struggle frequently with running reliably. This situation might create unexpected stoppages and the need for manual intervention steps to compensate for the shortcomings of these systems.

Therefore, there is a need for to provide a method for determining characteristics of a sample vessel/sample container, an analyzing device, and an in-vitro diagnostics system which can support secure and efficient handling of sample vessels in the in-vitro diagnostics system.

SUMMARY

According to the present disclosure, a method for determining characteristics of a sample container in an in-vitro diagnostics system is presented. The in-vitro diagnostics system can comprise an analyzing device having one or more processors. The method can comprise providing first image data representing a first image of a sample container in a first scenario. In the first scenario, a first illumination condition comprising a background illumination of the sample container can be applied to the sample container. The method can also comprise providing second image data representing a second image of the sample container in a second scenario. In the second scenario, a second illumination condition different from the first illumination condition can be applied to the sample container. The method can also comprise determining a mask from the first image. The mask can indicate a sub-image section of the first image comprising a representation of the sample container in the first image. The method can also comprise determining sub-image data from the second image containing a representation of the sample container in the second image by applying the mask to the second image and determining characteristics of the sample container from an image data analysis, comprising image data analysis of the sub-image data.

Accordingly, it is a feature of the embodiments of the present disclosure to provide a method for determining characteristics of a sample vessel (sample container), an analyzing device, and an in-vitro diagnostics system which can support secure and efficient handling of sample vessels in the in-vitro diagnostics system. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A method for determining characteristics of a sample vessel/sample container in an in-vitro diagnostics system is provided. The method can comprise, in an analyzing device of the in-vitro diagnostics system having one or more processors, providing first image data representing a first image of a sample vessel in a first scenario. In the first scenario, a first illumination condition comprising a background illumination of the sample vessel can be applied to the sample vessel. The method can also comprise providing second image data representing a second image of the sample vessel in a second scenario. In the second scenario, a second illumination condition different from the first illumination condition can be applied to the sample vessel. The method can also comprise determining a mask or a masked image from the first image. The mask can indicate a sub-image section of the first image comprising a representation of the sample vessel in the first image. The method can also comprise determining sub-image data, an image data subset from the second image, containing a representation of the sample vessel in the second image by applying the mask to the second image, and determining characteristics of the sample vessel from an image data analysis comprising image data analysis of the sub-image data.

An analyzing device for determining characteristics of a sample vessel/sample container is also provided. The analyzing device can comprise one or more processors. The one or more processors can be configured to provide first image data representing a first image of a sample vessel in a first scenario. In the first scenario, a first illumination condition comprising a background illumination of the sample vessel can be applied to the sample vessel. The one or more processors can also be configured to provide second image data representing a second image of the sample vessel in a second scenario. In the second scenario, a second illumination condition different from the first illumination condition can be applied to the sample vessel. The one or more processors can also be configured to determine a mask from the first image. The mask can indicate a sub-image section of the first image comprising a representation of the sample vessel in the first image. The one or more processors can also be configured to determine sub-image data from the second image containing a representation of the sample vessel in the second image by applying the mask to the second image and to determine characteristics of the sample vessel from an image data analysis comprising image data analysis of the sub-image data.

An in-vitro diagnostics system is also provided. The system can comprise an analyzing device having one or more processors. The analyzing device can be configured to provide first image data representing a first image of a sample vessel in a first scenario. In the first scenario, a first illumination condition comprising a background illumination of the sample vessel can be applied to the sample vessel. The analyzing device can also be configured to provide second image data representing a second image of the sample vessel in a second scenario. In the second scenario, a second illumination condition different from the first illumination condition can be applied to the sample vessel. The analyzing device can also be configured to determine a mask from the first image. The mask can indicate a sub-image section of the first image comprising a representation of the sample vessel in the first image. The analyzing device can also be configured to determine sub-image data from the second image containing a representation of the sample vessel in the second image by applying the mask to the second image and to determine characteristics of the sample vessel from an image data analysis, comprising image data analysis of the sub-image data.

An in-vitro pre-analytical system comprising an analyzing device having one or more processors is also provided. The analyzing device can be configured to provide first image data representing a first image of a sample vessel in a first scenario. In the first scenario, a first illumination condition comprising a background illumination of the sample vessel can be applied to the sample vessel. The analyzing device can also be configured to provide second image data representing a second image of the sample vessel in a second scenario. In the second scenario, a second illumination condition different from the first illumination condition can be applied to the sample vessel. The analyzing device can also be configured to determine a mask from the first image. The mask can indicate a sub-image section of the first image comprising a representation of the sample vessel in the first image. The analyzing device can also be configured to determine sub-image data from the second image containing a representation of the sample vessel in the second image by applying the mask to the second image and to determine characteristics of the sample vessel from an image data analysis comprising image data analysis of the sub-image data.

These proposed techniques can provide for more reliable methods of identification of the sample vessel as well as the properties and position of the sample vessel in the digital images taken for the different scenarios. Based on the first image, the mask of the sample vessel can be determined from the first image. The mask of the vessel can indicate the outline of the sample vessel, which in some embodiments may also referred be to as contour of the sample vessel. Following, sample/sample vessel characteristics can be determined with improved accuracy. Determining the characteristics with higher reliability can support a safer operation of the in-vitro diagnostics system.

In an alternative embodiment, characteristics for more than one sample vessel (i.e., a plurality of sample vessels) may be determined. Characteristics common to all sample vessels may be determined. Alternatively, different characteristics for different sample vessels may be determined.

The method may further comprise generating third image data representing a third image of the sample vessel. The third image data can comprise the sub-image data. The third image can show at least the image data from the image area defined by applying the mask (i.e., outline or contour of the sample vessel). In some embodiments, the processing of image data of the third image may be independent of the digital image analysis for determining the characteristics of the sample/sample vessel.

The second image data may be provided with a second illumination condition selected from the following group: without the background illumination; a non-background illumination different from the background illumination only such that at least one top illumination or at least one front illumination is provided; and a combination of the background illumination and the non-background illumination. One or more of the illumination conditions from the group may be applied.

The method may further comprise applying diffuse illumination under at least one of the background illumination and the non-background illumination.

Background image data may be provided that can represent a background image of a background scenario missing the sample vessel. In the background scenario, the first illumination condition can be applied. The background scenario may correspond to the first scenario applying the first illumination condition but with the missing or lacking the sample vessel.

The mask may indicate which part of the first image relates to the sample vessel and which part of the first image does not relate to the sample vessel.

Determining the mask may comprise processing the first image data and the background image data.

The processing of the first image data and the background image data may comprise comparing brightness of an image area in the first image to a corresponding image area in the background image.

The determining of the mask may comprise determining a transmission value for each point/pixel in the first image. The determining may comprise comparing the first image to the background image. For example, the first image and the background image may be compared by comparing the images pixel by pixel. It may be provided that if the transmission value of an image pixel is smaller than a threshold value, for example, by about 90%, about 95%, or about 98%, the image pixel, in the mask, can be assigned to an image area related to the sample vessel, and otherwise, the pixel can be assigned to an image area not related to the sample vessel (background). By determining transmission values, transparent bodies or sections of sample vessels may also be detected.

Reference image data may be provided which can represent a reference image of a background scenario missing the sample vessel. The second illumination condition can be applied. A reference object may be provided in a location in which the sample vessel is located in the first and/or the second scenario. The reference object may be, for example, a flat material object having a defined reflectance. Alternatively, a surface of the background illumination (device) may be applied as the reference object.

It may be provided that, by use of the reference image, a corrected interim image can be generated which can replace the second image. The generating may comprise correcting the second image for inhomogeneous spatial illumination and/or correcting the second image spectrally.

The determining of the characteristics may comprise determining, for the sample vessel or a sub-part of the sample vessel, at least one of: geometric characteristics; color characteristics; type of vessel; position of the sample vessel; presence or non-presence of sample in the sample vessel; status of sample in the sample vessel; status of sampling of sample in the sample vessel; and/or information provided on the sample vessel.

Figure 1:
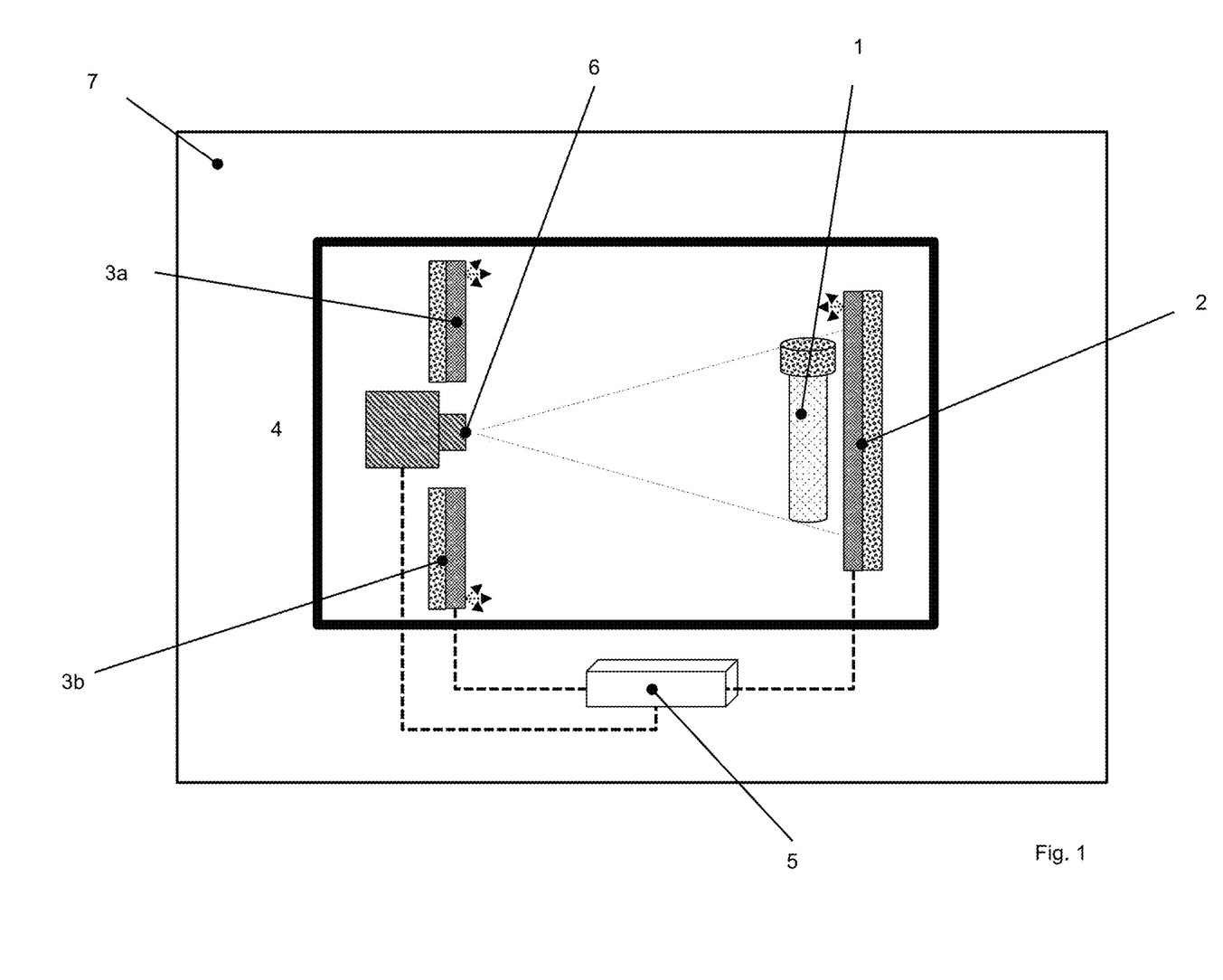
FIG. 1 illustrates a schematic representation of an arrangement for detecting images of a sample vessel provided in different scenarios applying different illumination conditions for the sample vessel according to an embodiment of the present disclosure.
Figure 2:
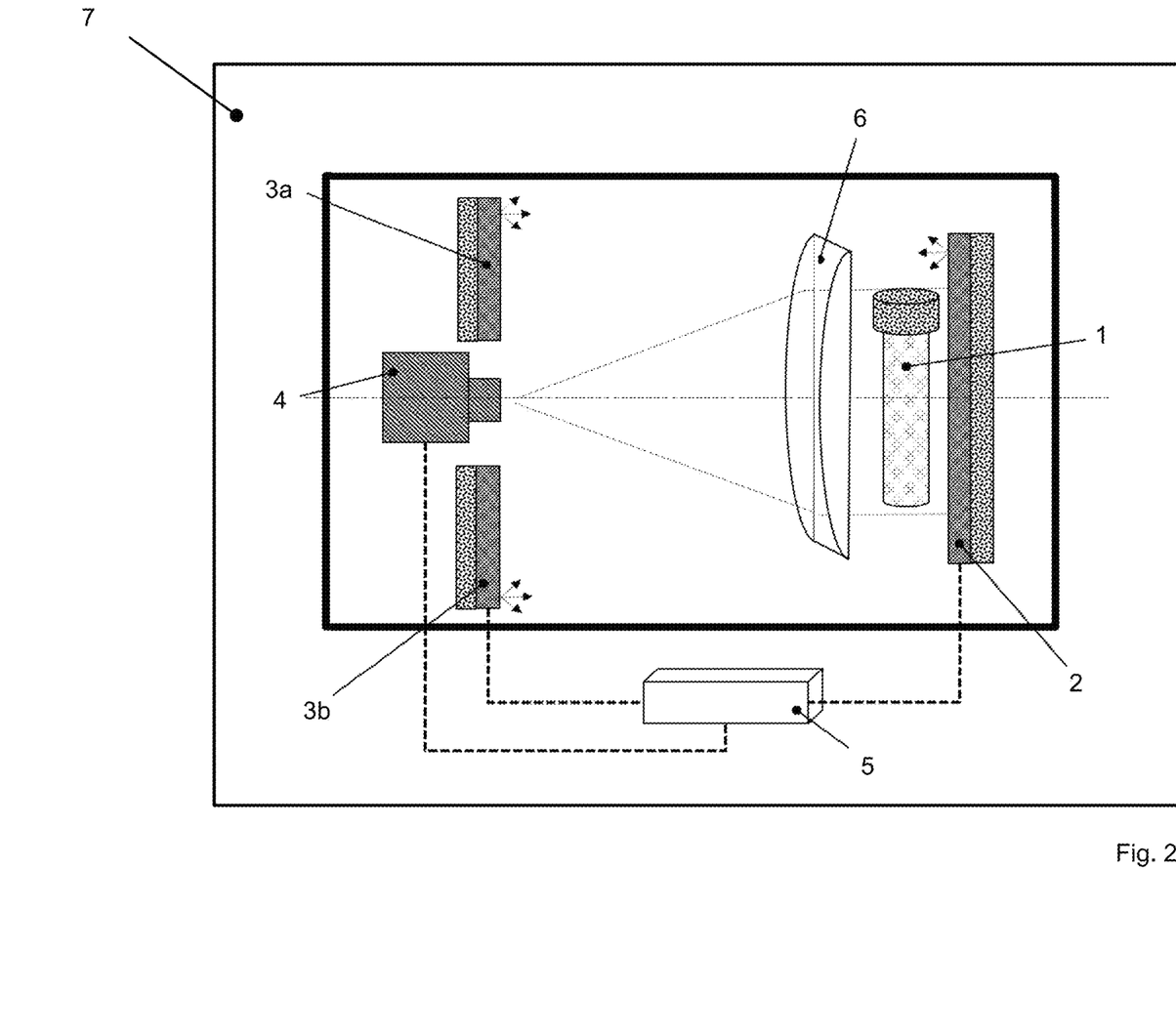
FIG. 2 illustrates a schematic representation of another arrangement for detecting images of a sample vessel provided in different scenarios applying different illumination conditions for the sample vessel according to an embodiment of the present disclosure.

FIGS. 1 and 2 show a schematic representation of an arrangement for detecting and processing images such as, for example, digital images, of a sample vessel 1 provided in different scenarios applying different illumination conditions to the sample vessel 1. The sample vessel 1 may contain a test sample such as a blood or tissue sample that has been taken from human body. Diseases or other conditions may be detected by analyzing the test sample received in the sample vessel 1 using an in-vitro diagnostics system.

The arrangements depicted in FIGS. 1 and 2 may be used in an analyzing device provided in the in-vitro diagnostics system for detecting a plurality of images of the sample vessel 1 in different scenarios distinguished by different illumination conditions applied to the sample vessel 1.

The images detected by the arrangements in FIGS. 1 and 2, following detection, may be analyzed by image data analysis or by processing for determining characteristics (i.e., characteristics of the sample vessel 1) for the sample vessel 1. Information about the characteristics of the sample vessel 1 can be processed or used in the in-vitro diagnostics system for operation of the system. Thus, reliable determination of the characteristics will support safer operation of the sample vessel 1 as well as a sample received in the sample vessel 1 in the in-vitro diagnostics system. For example, in response to determining specific characteristics, the sample vessel 1 may have a special procedure of sample analysis in the in-vitro diagnostics system, whereby the special procedure can be assigned by the determined characteristic(s) of the sample vessel 1.

For the arrangements depicted in FIGS. 1 and 2, there can be a background illumination device 2 for providing background illumination to the sample vessel 1. The background illumination device 2 can mainly direct light to the backside of the sample vessel 1, or to parts of the sample vessel 1 being analyzed. Further, illumination devices 3a, 3b can be provided, for example, for applying diffuse illumination. The background illumination device 2 may also be provided with a light source for diffuse background illumination. In an alternative embodiment, at least one of the background illumination device 2 and the illumination devices 3a, 3b may be configured to provide non-diffuse illumination for the sample vessel 1. The illumination devices 3a, 3b may applied front and/or top illumination to the sample vessel 1, thereby, providing the option of applying different illumination conditions to the sample vessel 1 in different scenarios.

Additionally, in the embodiments shown, the background illumination device 2 can extend illumination over the entire length of the sample vessel 1. For example, the background illumination device 2 may be provided with self-shining illumination panels, for example, light emitting diode (LED) or organic light emitting diode (OLED) based illumination panels, or non-self-shining surfaces, to be indirectly illuminated. Similar configuration may be provided for the illumination devices 3a, 3b. The wavelength of the illumination can be selected according to the application. Simple sample vessel presence detection may use a narrow bandwidth light such as, for example, from a colored LED. Additionally, to determine the color of the cap, white light may be needed.

A detecting device 4 can be provided for detection or acquisition of images such as, for example, digital images, of the sample vessel 1 while the sample vessel 1 is illuminated by the background illumination device 2 and/or the illumination devices 3a, 3b. In addition, images may be detected by the detection device 4 in the case where there is no illumination by the light sources of the background illumination device 2 and the illumination devices 3a, 3b for the sample vessel 1. A camera provided with the detection device 4 can be "grey-scale" camera, an RGB camera, or may be a camera with specific sensitivity, depending on the purpose or application. The detection device 4 may also have time of flight capabilities or may be a stereo-camera, in order to also retrieve 3D data or distance information. The back or background illumination device 2, with respect to the detecting device 4, can be placed at a distance from the sample vessel or container 1.

The background illumination device 2, the illumination devices 3a, 3b, and the detection device 4 which may be provided with a digital camera connected to a control device 5, can be configured to control operation of the different devices while the images of the sample vessel 1 can be detected for the different scenarios. The control device 5 can control the detection device 4 and the illumination of the scenario by at least one of the background illumination device 2 and/or the illumination devices 3a, 3b in the process of image acquisition. This may include triggering of components, supplying power, synchronizing, and/or parametrizing. The control device 5 may also be configured to process the images according to the different embodiments disclosed here.

For the different arrangements in FIGS. 1 and 2, there can be optical elements 6 of different types such as, for example, a field lens (see, e.g., FIG. 1) and/or a cylinder lens (see e.g., FIG. 2) for providing optimized optical conditions depending on the scenario to be detected.

An analyzing device 7 which may be implemented together with the control device 5 and which can comprise one or more processors for processing digital image data can be connected to the detection device 4. A plurality images detected by the detection device 4 can be processed in the analyzing device 7 for determining characteristics of the sample vessel 1. The analyzing device 7 may be connectable to a hosting or server device (not shown) for data communication and synchronization.

Figure 3:
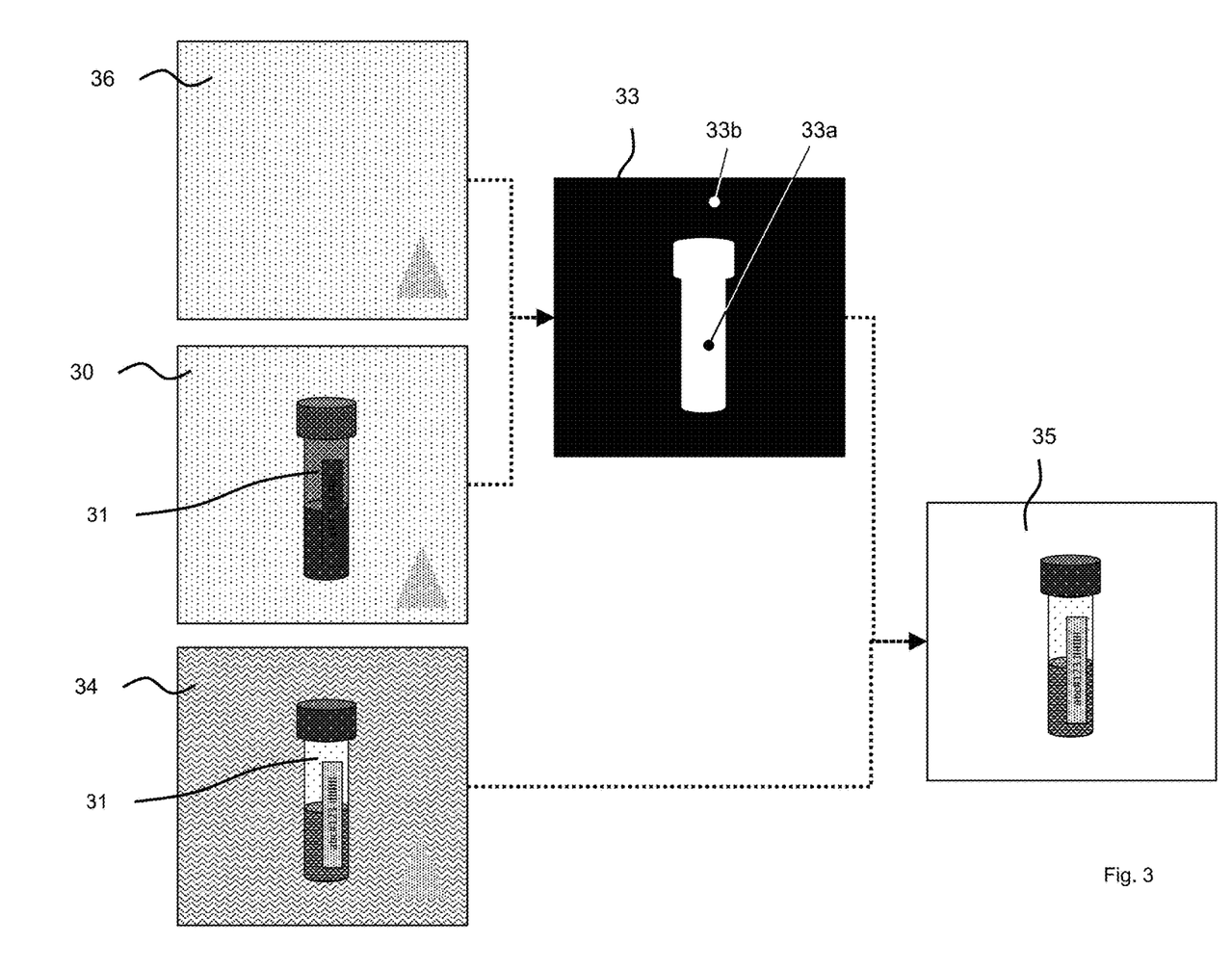
FIG. 3 illustrates a schematic representation of different images provided in a method for determining characteristics of a sample vessel in an in-vitro diagnostics system according to an embodiment of the present disclosure.
Figure 4:
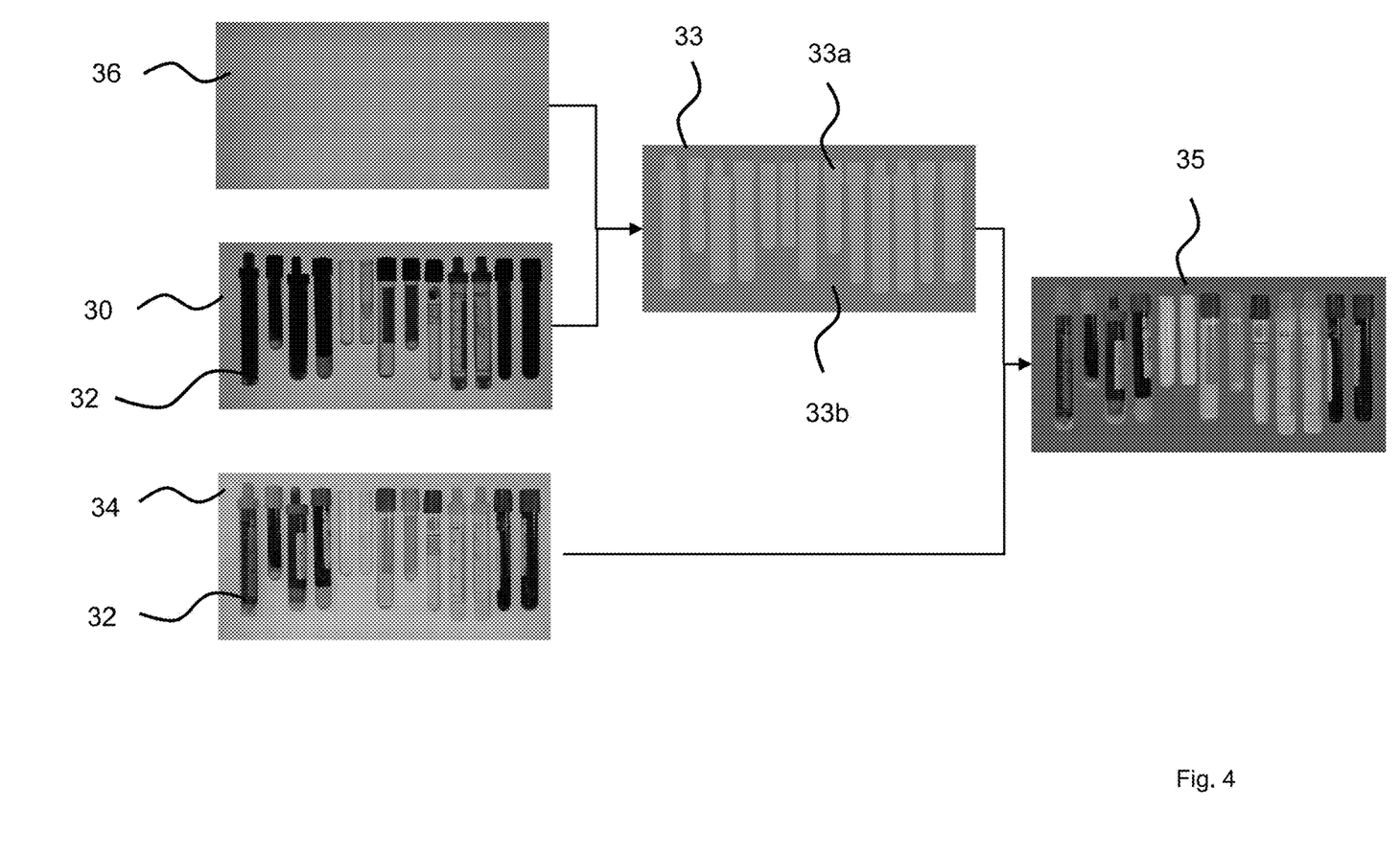
FIG. 4 illustrates a further schematic representation of different images provided in a method for determining characteristics of a sample vessel in an in-vitro diagnostics system, wherein images for a plurality of sample vessels are taken according to an embodiment of the present disclosure.

FIG. 3 and FIG. 4 each show a schematic representation of a plurality of digital images provided in a method for determining characteristics for one or more sample vessels from the images detected, for example, by one of the arrangements shows in FIGS. 1 and 2. The plurality of images detected by the detection device 4 can be processed by the analyzing device 7 as will be described in the following. According to the embodiment in FIG. 3, in a first image 30, there can be a sample vessel 31 shown representing a single sample vessel such as the sample vessel 1 depicted in FIGS. 1 and 2.

FIG. 4 shows a further schematic representation of different images provided in a method for determining characteristics of a sample vessel in an in-vitro diagnostics system, wherein the images for a plurality of sample vessels 32 can be provided. According to FIG. 4, in an alternative embodiment, there can be the plurality of sample vessels 32 shown in the first image 30, the plurality of sample vessels 32 can represent a plurality of sample vessels each to receive a sample such as a plurality of the sample vessel 1. FIG. 4 also illustrates how even the transparent sections of the sample vessels 32 can be well displayed by applying front illumination.

The first image 30 represents an image of the sample vessel 31 in a first scenario that can apply background illumination to the sample vessel 31. Similarly, the first image 30 in FIG. 4 represents an image of the plurality of sample vessels 32 in a first scenario applying background illumination provided by the background illumination device 2.

A mask 33 for the sample vessel 31/the plurality of sample vessels 32 can be provided. The mask 33 can represent an outline or contour of the sample vessel 31 or the plurality of sample vessels 32. The mask 33 can be generated by image data analysis or processing of the first image 30. The mask 33 can comprise an area 33a related to the sample vessel(s) 31, 32 and an area 33b not related to the sample vessel(s) 31, 32 but, instead, to the background.

Still referring to FIGS. 3 and 4, there is a second image 34 showing the sample vessel 31/the plurality of sample vessels 32 in a second scenario for which a second illumination condition can be applied which is different from the first illumination condition applied for detecting the first image 30. In the embodiment shown in FIG. 4, the second illumination condition can apply background illumination provided by the background illumination device 2 and (in addition to the first scenario) top and/or front illumination provided by the illumination devices 3a, 3b.

The mask 33 can be applied to the second image 34 for processing a masked image 35, which can comprise image data from image data subsets in the second image 34. The image data subsets can be defined by the mask 33. The outcome of the process described can be that the tube images of the sample vessel 31/the plurality of sample vessels 32 depicted by the image data subsets clearly separated from the background, can be in full color, and can have no reflections and no shadows. Therefore, the masked image 35 can specifically enable an easy and reliable image analysis, such as for vessel-position and vessel-type-recognition.

Subsequently, the masked image 35 can be processed for determining characteristics for one or all of the sample vessels 31, 32. For example, the characteristics to be determined by image data analysis may comprise one or more of the following characteristics: presence or absence of a sample vessel; position of sample container(s); positioning of sample vessel; a gripping point of a sample vessel; size of sample container; status of sample container, e.g., filled or unfilled; property of part of container, e.g., color of cap, length of tube, level; and sample container type. Such data or image analysis of the masked image 35 is known as such.

The process or method outlined above can provide for a more reliable determination of the characteristics of the sample vessel 31, 32 from the masked image 35, which can be derived from image data processing based on the first image 30, the second image 34, and the mask 33.

According to the embodiment shown in FIGS. 3 and 4, a background image 36 can be detected by the detection device 4 for a background scenario. For the background scenario, the first illumination condition can be applied. The background illumination can be provided by background illumination device 2. In the background scenario, any sample vessel can be missing or lacking.

The background image 36, together with the first image 30, can be processed for determining the mask 33. The determining of the mask 33 may comprise determining a transmission value for each point, pixel or section in the first image 30. The first image 30 can be compared to the background image 36. For example, the first image 30 and the background image 36 may be compared by comparing the images pixel by pixel. It may be provided that if the transmission value of an image pixel is smaller than a threshold value, for example, by about 90%, about 95%, or about 98%, the corresponding image pixel, in the mask 33, can be assigned to an image area related to the sample vessel 31, 32, and otherwise, the pixel can be assigned to an image area not related to the sample vessel 31, 32 (i.e., background). By determining transmission values, transparent bodies may also be detected.

At least one of the first image 30, the mask 33, the second image 34, the background image 36, and the reference image 50, for example, may be stored in a memory of the control device 5 or a memory accessible by the control device 5.

Figure 5:
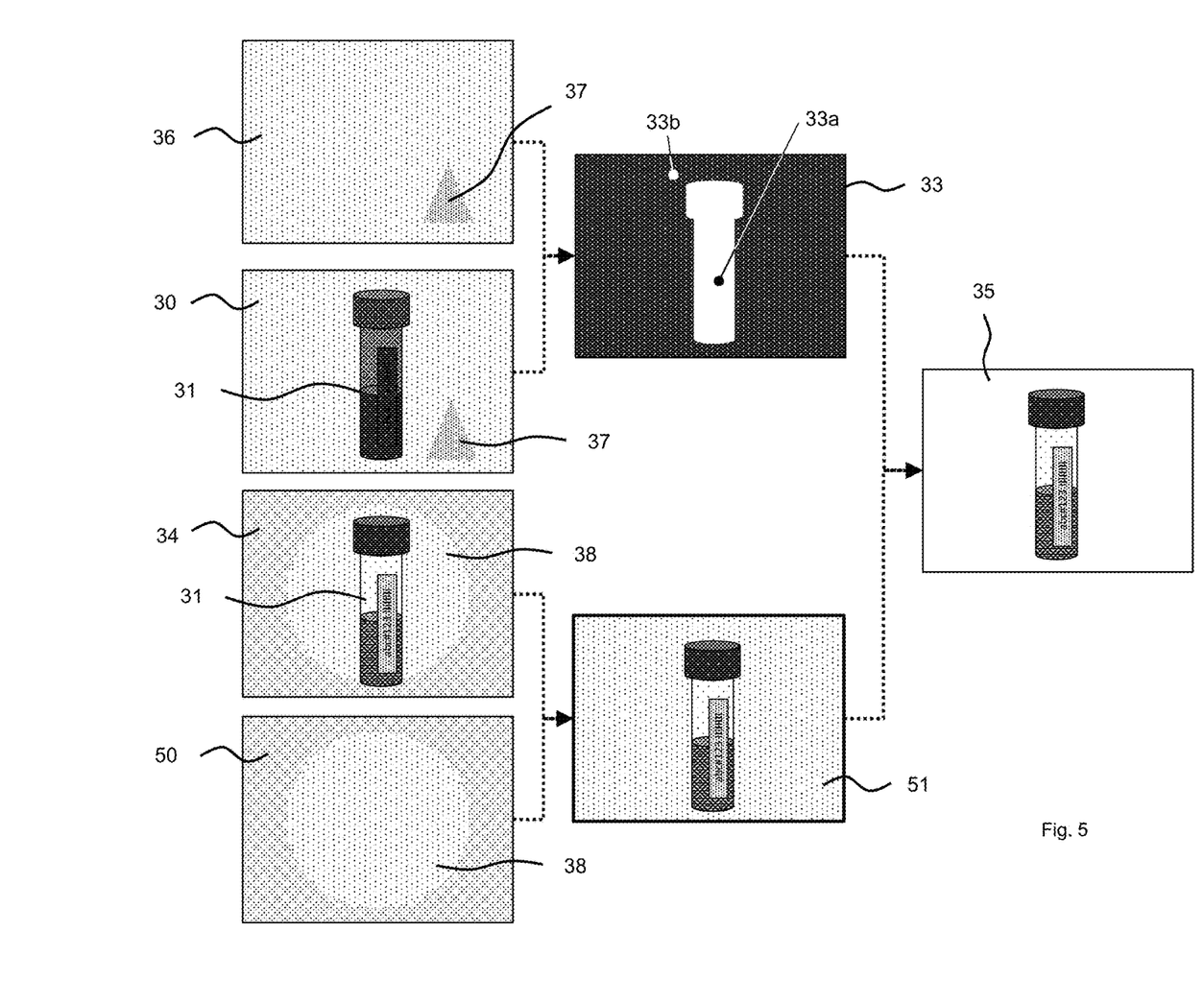
FIG. 5 illustrates a schematic representation of different images provided in a method for determining characteristics of a sample vessel in an in-vitro diagnostics system using flat field and/or white balance correction according to an embodiment of the present disclosure.

FIG. 5 shows a schematic representation of different images provided in a method for determining characteristics of a sample vessel in an in-vitro diagnostics system using flat field and/or white balance correction.

In the background image 36, a triangle symbol 37 is depicted which can schematically represent a real or virtual object in the background illumination scenario, for example, a lighting inhomogeneity. Since the real or virtual object, symbolically represented by the triangle 37, can be present in both in the background image 36 and in the first image 30 showing the sample vessel 31, it may not have a negative impact on the mask 33.

In the second image 34, a circle symbol 38 is shown which can schematically represent, for example, an illumination inhomogeneity, specifically in a front lighting situation applying the illumination devices 3a, 3b. Such illumination inhomogeneity, for example, may refer to edge areas being less bright. It can be caused by the illumination devices 3a, 3b and/or imaging optics applied.

A reference image 50, which may also be referred to second background image, can be provided for compensating for the inhomogeneity schematically represented by the circle symbol 38. The reference image 50 and the second image 34 can be processed for determining a corrected interim image 51 corrected with respect to the inhomogeneity schematically represented by the circle symbol 38. Following, the masked image 35 can be determined by processing the mask 33 and the corrected interim image 51.

With respect to the inhomogeneity represented by the circle symbol 38, a white plate may be used as a reference, which may "beautifully" reflect differences in exposure. Since the illumination inhomogeneity can be invariant over time, as long as the setup does not change, it may be sufficient to capture and store the reference image 50 once. The brightness distribution of the reference image 50 without the sample vessel 31 can then serve as compensation or correction. If, for example, an image subarea is only half as bright as another image subarea different from the image subarea, intensity pixel values of the image subarea can be scaled up accordingly. If, in addition, a neutral white image subarea does not show a nominal red green blue (RGB) ratio, e.g., 1:1:1, these RGB ratios can be normalized, which technically can correspond to a white balance. The latter can serve to correct color errors caused by the illumination or the color reproduction of the detection device 4, such as a digital camera.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

I claim:

1. A method for determining characteristics of a sample container in an in-vitro diagnostics system, the in-vitro diagnostics system comprising an analyzing device having one or more processors, the method comprising:
providing first image data representing a first image of a sample container in a first scenario, wherein in the first scenario, a first illumination condition comprising a background illumination of the sample container is applied to the sample container;
providing second image data representing a second image of the sample container in a second scenario, wherein in the second scenario, a second illumination condition different from the first illumination condition is applied to the sample container;
determining a mask from the first image, the mask indicating a sub-image section of the first image comprising a representation of the sample container in the first image;
determining sub-image data from the second image containing a representation of the sample container in the second image by applying the mask to the second image; and
determining characteristics of the sample container from an image data analysis, comprising image data analysis of the sub-image data.

2. The method of claim 1, further comprising,
generating third image data representing a third image of the sample container, the third image data comprising the sub-image data.

3. The method of claim 1, further comprising,
providing the second image data with a second illumination condition for the sample container selected from the following group: without the background illumination, a non-background illumination different from the background illumination only such as at least one top illumination and one front illumination, and a combination of the background illumination and the non-background illumination.

4. The method of claim 3, further comprising,
applying diffuse illumination for at least one of the background illumination and the non-background illumination.

5. The method of claim 1, further comprising,
providing background image data representing a background image of a background scenario missing the sample container, wherein in the background scenario, the first illumination condition is applied.

6. The method of claim 5, wherein determining the mask comprises processing the first image data and the background image data.

7. The method of claim 6, where the processing of the first image data and the background image data comprises comparing brightness of an image area in the first image to a corresponding image area in the background image.

8. The method of claim 1, further comprising,
providing reference image data representing a reference image of a background scenario missing the sample container, wherein the second illumination condition is applied.

9. The method of claim 8, wherein via the reference image, a corrected interim image is generated which replaces the second image, the generating comprising at least one of correcting the second image for inhomogeneous spatial illumination and correcting the second image spectrally.

10. The method according to claim 1, wherein determining the characteristics comprises determining, for the sample container or a subpart of the sample container, at least one of: geometric characteristics; color characteristics; type of container; position of the sample container; status of the sample container; presence or non-presence of a sample container; presence or non-presence of a sample in the sample container; and information provided on the sample container.

11. An analyzing device for determining characteristics of a sample container, the analyzing device comprising:
one or more processors, the one or more processors configured to
provide first image data representing a first image of a sample container in a first scenario, wherein in the first scenario, a first illumination condition comprising a background illumination of the sample container is applied to the sample container, provide second image data representing a second image of the sample container in a second scenario, wherein in the second scenario, a second illumination condition different from the first illumination condition is applied to the sample container, determine a mask from the first image, the mask indicating a sub-image section of the first image comprising a representation of the sample container in the first image, determine sub-image data from the second image containing a representation of the sample container in the second image by applying the mask to the second image, and determine characteristics of the sample container from an image data analysis, comprising image data analysis of the sub-image data.

12. An in-vitro diagnostics system, the in-vitro diagnostics system comprising:

an analyzing device having one or more processors, the analyzing device configured to provide first image data representing a first image of a sample container in a first scenario, wherein in the first scenario, a first illumination condition comprising a background illumination of the sample container is applied to the sample container, provide second image data representing a second image of the sample container in a second scenario, wherein in the second scenario, a second illumination condition different from the first illumination condition is applied to the sample container, determine a mask from the first image, the mask indicating a sub-image section of the first image comprising a representation of the sample container in the first image, determine sub-image data from the second image containing a representation of the sample in the second image by applying the mask to the second image, and determine characteristics of the sample container from an image data analysis, comprising image data analysis of the sub-image data.

13. An in-vitro pre-analytical system, the in-vitro pre-analytical system comprising:

an analyzing device having one or more processors, the analyzing device configured to provide first image data representing a first image of a sample container in a first scenario, wherein in the first scenario, a first illumination condition comprising a background illumination of the sample container is applied to the sample container, provide second image data representing a second image of the sample container in a second scenario, wherein in the second scenario, a second illumination condition different from the first illumination condition is applied to the sample container, determine a mask from the first image, the mask indicating a sub-image section of the first image comprising a representation of the sample container in the first image, determine sub-image data from the second image containing a representation of the sample container in the second image by applying the mask to the second image, and determine characteristics of the sample container from an image data analysis, comprising image data analysis of the sub-image data.

\* \* \* \* \*